United States Patent
Labonte et al.

(10) Patent No.: US 6,259,918 B1
(45) Date of Patent: Jul. 10, 2001

(54) PRESERVATION OF CELL BORDERS AT HAND-OFF WITHIN A SMART ANTENNA CELLULAR SYSTEM

(75) Inventors: Sylvain Labonte, St-Bruno de Montarville; Michel Desgagne, St-Hubert; Pat Minichiello, Montreal; Gopichand Kongara, Town of Mount Royal, all of (CA)

(73) Assignee: Telefonaktiebolaget LM (publ) (SE)

( * ) Notice: Subject to any disclaimer, the term of this patent is extended or adjusted under 35 U.S.C. 154(b) by 0 days.

(21) Appl. No.: 09/282,114

(22) Filed: Mar. 31, 1999

Related U.S. Application Data (60) Provisional application No. 60/121,788, filed on Feb. 26, 1999.

(51) Int. Cl.[7] .......................................... H04Q 7/20
(52) U.S. Cl. ...................... 455/437; 455/436; 455/442
(58) Field of Search ................................. 455/436, 437, 455/438, 439, 440, 441, 442, 443, 444, 446, 561, 562; 370/320, 321

(56) References Cited

U.S. PATENT DOCUMENTS

| | | |
|---|---|---|
| 4,881,082 | 11/1989 | Graziano . |
| 5,276,907 | 1/1994 | Meidan ................................ 455/33.3 |
| 5,508,707 | 4/1996 | LeBlanc et al. . |
| 5,576,717 | 11/1996 | Searle et al. . |
| 5,596,329 | 1/1997 | Searle et al. . |
| 5,714,957 | 2/1998 | Searle et al. . |
| 5,845,212 | 12/1998 | Tanaka ................................ 455/437 |
| 5,966,661 | * 10/1998 | Bernardin et al. .................... 455/446 |
| 6,119,010 | * 10/1998 | Labedz ................................. 455/446 |

FOREIGN PATENT DOCUMENTS

| | | |
|---|---|---|
| 0 639 035 | 7/1994 | (EP) . |
| 0 659 028 | 12/1994 | (EP) . |
| WO 95/12296 | 5/1995 | (WO) . |
| WO 96/00484 | 1/1996 | (WO) . |
| WO 96/38015 | 11/1996 | (WO) . |
| WO 96/38997 | 12/1996 | (WO) . |
| WO 98/21908 | 5/1998 | (WO) . |

OTHER PUBLICATIONS

International Search Report PCT/SE99/02492, dated Jul. 26, 2000.

* cited by examiner

Primary Examiner—Vivian Chang
Assistant Examiner—Duc Nguyen
(74) Attorney, Agent, or Firm—Jenkens & Gilchrist (57) ABSTRACT

A cellular communications network includes a plurality of cells whose base stations have both sector and smart antenna capabilities. While engaged in a call, mobile station downlink signal strength measurements are made on its own serving traffic channel and the control channels of neighboring cells. These measurements are then adjusted by one or more factors which take into account the operational and physical differences between sector antenna and smart antenna. For example, the signal strength measurements may be appropriately adjusted by measured differences in gain between the smart antenna and sector antenna, output power backoff values associated with smart antenna and sector antenna support of the traffic channels in comparison to the control channels, and power control attenuation applied to the traffic channels. The resulting adjusted downlink signal strength measurements may then be compared against each other (as off-set by any imposed hysteresis value) to more precisely locate the mobile station and uniformly, predictably and accurately identify when it is appropriate to authorize a hand-off.

20 Claims, 4 Drawing Sheets

PRESERVATION OF CELL BORDERS AT HAND-OFF WITHIN A SMART ANTENNA CELLULAR SYSTEM

CROSS-REFERENCE TO RELATED APPLICATIONS

The present application for patent is related to and incorporates by reference previously filed, commonly assigned, co-pending U.S. application for patent Ser. No. 08/994,586, filed Dec. 19, 1997, entitled "Method and System for Improving Handoffs in Cellular Mobile Radio Systems".

The present application claims priority from and incorporates by reference previously U.S. Provisional Application for Patent Ser. No. 60/121,788, filed Feb. 26, 1999, entitled "Preservation of Cell Borders at Hand-off within a Smart Antenna Cellular System."

BACKGROUND OF THE INVENTION

1. Technical Field of the Invention

The present invention relates to a cellular telephone network implementing a smart antenna technology in addition to sector antenna technology at its base stations and, in particular, to a hand-off procedure for use in connection with such a network, wherein the handoff procedure preserves the cell borders defined for each cell by sector antenna operation.

2. Description of Related Art

Figures 1, 2A, 2B:
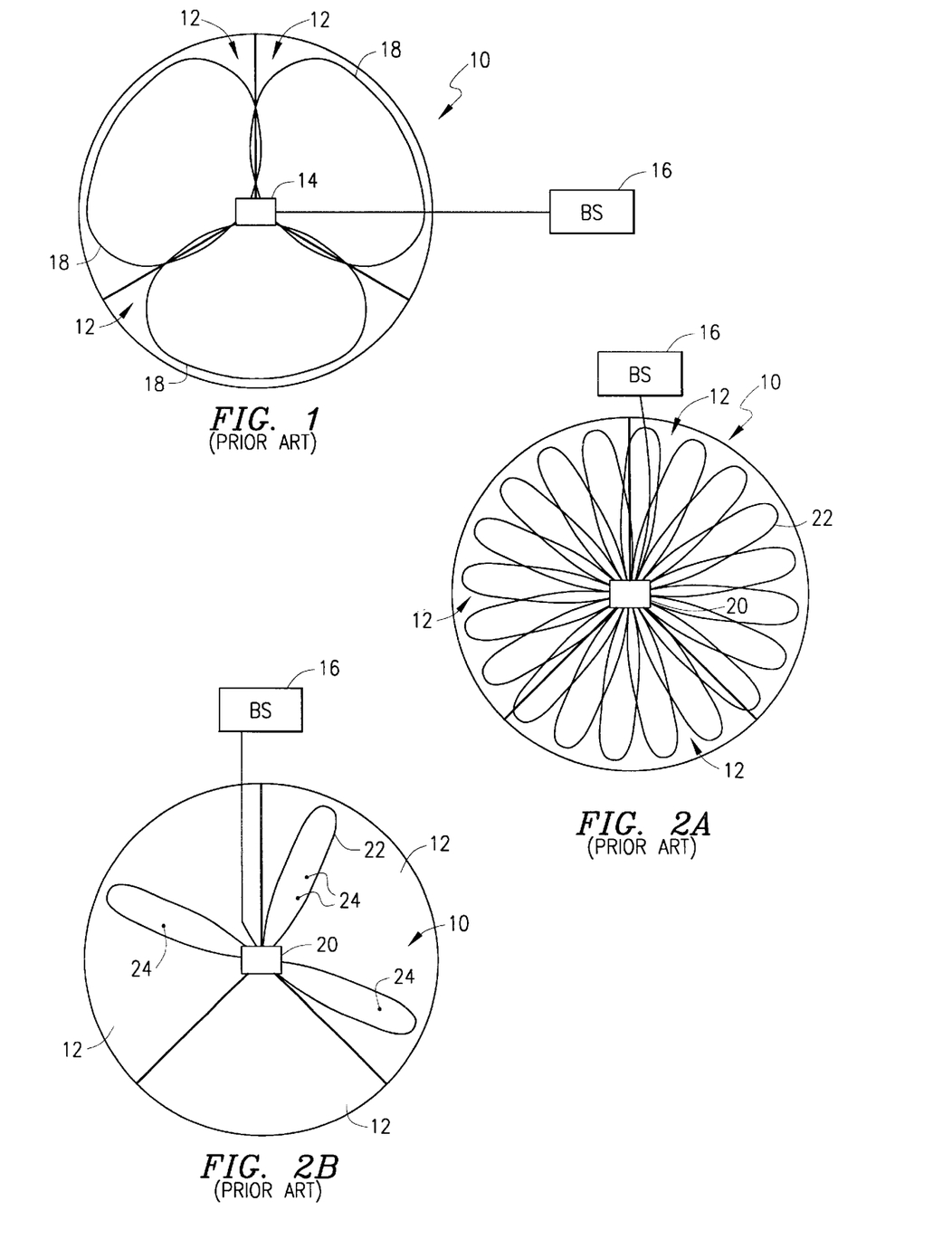
FIG. 1, previously described, is a diagram of directive antenna beam coverage within a sectorized cell of a cellular communications network.
FIGS. 2A and 2B, previously described, are diagrams of directive antenna beam coverage within a smart antenna equipped cell of a cellular communications network.

It is well known in the art to utilize directive antennas in cellular communications networks. The most commonly recognized example of directive antenna use in cellular communications networks is based on the principle of sectorization, as is illustrated in FIG. 1. A cell site 10 may comprise either one omnidirectional cell or a plurality, for example, three (or more), sector cells 12. Directive antennas 14, each with an appropriately selected beamwidth for the sector cell 12, are then utilized at each base station 16 to form a plurality of wide beams 18, one per sector cell, with the totality of the beams formed thereby providing substantially omni-directional radio frequency coverage throughout the cell site area. In operation, each of the formed wide beams 18 is in continuous use to provide service within each corresponding sector cell 12.

Another example of directive antenna use in cellular communications networks is based on the use of smart antenna technology, as is illustrated in FIG. 2A. Directive antennas 20 are utilized at each base station 16 of a cell site 10 to form a plurality of separate, perhaps slightly overlapping, narrow beams 22 within each sector cell 12, with the totality of the beams formed thereby providing substantially omni-directional radio frequency coverage throughout the cell site area. In operation, and in contrast to the operation of the sectorized beams 18 of FIG. 1, the narrow beams 22 are intermittently used only when necessary to provide service to one or more mobile stations 24, as is illustrated in FIG. 2B. Put another way, in smart antenna technology, the base station 16 controls its directive antenna 20 to activate at any given time only those individual ones of the plurality of separate, perhaps slightly overlapping, narrow beams 22 as are needed to serve active mobile stations 24 within the cell site 10.

Figure 3:
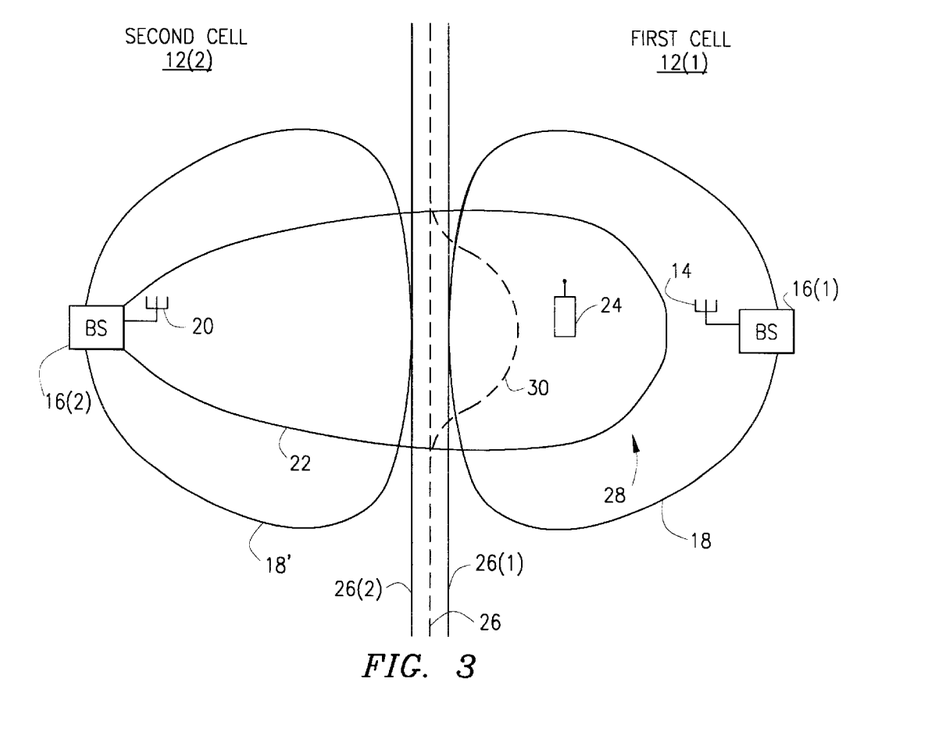
FIG. 3, previously described, is a diagram of directive antenna beam coverage from adjacent cells.

Reference is now made to FIG. 3 wherein there is shown a diagram of directive antenna beam coverage from adjacent cells 12. Suppose a first cell 12(1) includes a directive (sector) antenna 14, having an appropriately selected beamwidth for the sector, at its base station 16(1) that is operable to provide a sector coverage beam 18 to serve a mobile station 24. Suppose further that a second, adjacent, cell 12(2) includes a directive (smart) antenna 20 at its base station 16(2) that is operable to form, at any one time, a narrow beam 22 to serve a mobile station 24. The theoretical (or ideal) hand-off border 26 between the first cell 12(1) and the second cell 12(2) would lie approximately half-way between the base stations 16 for the respective cells 12 and would be defined by approximate interaction of the sector coverage beam 18 in the first cell and a theoretical (or perhaps physical, if present) sector coverage beam 18' in the second cell.

It is noted here that the theoretical border 26 is illustrated in the manner of a zone between lines 26(1) and 26(2) to account for the fact that hysteresis values, as is well known in the art, affect the relative location between the base stations where hand-off would actually occur. More specifically, because of the introduced hysteresis value, which must be met by the signal strength measurements made with respect to, and compared between, the two cells 12, a mobile station 24 moving from the first cell 12(1) into the second cell 12(2) would not actually achieve a hand-off until at least reaching line 26 (2). Conversely, a mobile station 24 moving from the second cell 12(2) into the first cell 12(1) would not actually achieve a hand-off until at least reaching line 26(1).

One advantage of the use of smart antennas 20 is the extended range of coverage, as generally indicated at 28, obtained when compared to the range of coverage provided by sector antennas 14. One consequence of this extended coverage range 28 is a disturbance in location of the cell border 26, as generally shown at 30. A number of drawbacks arise from such a disturbance 30 in the cell border 26. First, the base station 16(2) tends to provide service to mobile stations 24 which are not located within or near its cell 12(2), and thus service load between the cells is not properly shared and system management issues become too complex. Second, the base station 16(2) downlink broadcasts made from the second cell 12(2) in order to provide service to a distant mobile station may be made at such a high power level as to inject downlink co-channel interference into other cells within the network which reuse its same frequency. Third, distant mobile station 24 uplink broadcasts may be made at such a high power level as to more quickly and unnecessarily drain battery life. Further, because the mobile station is in the vicinity of a cell other than cell 12(2), uplink co-channel interference will also increase in the reuse cells.

There is accordingly a need for a hand-off technique that accounts for the extended coverage range 28 of smart antennas 20 in comparison to sector antennas 14 and thus corrects for any introduced disturbance 30 in location of the cell border 26 in making the hand-off determination.

SUMMARY OF THE INVENTION

In connection with making a determination to hand-off a mobile station, the mobile station makes downlink signal strength measurements on its own serving traffic channel as well as the measurement (control) channels of at neighboring cells. Hand-off is appropriate if the signal strength measurement on a neighboring cell's measurement channel exceeds the signal strength measurement for the own serving cell's traffic channel (as off-set by any imposed hysteresis value). In connection with measurements made on measurement and traffic channels with respect to cells possessing both sector antenna and smart antenna capabilities, however, these downlink signal strength measurements have to be adjusted to take into account the operational and physical differences between sector antennae and smart antennae.

Turning first to the downlink signal strength measurement on the own serving cell's traffic channel: in accordance with one aspect of the present invention, the downlink signal strength measurement on the own serving cell's traffic channel is adjusted by a first factor accounting for any noted difference in gain between the sector antenna and smart antenna of that cell as a function of azimuth angle of orientation of the mobile station to the serving cell's base station. In accordance with another aspect of the present invention, the downlink signal strength measurement on the own serving cell's traffic channel is adjusted by a second factor accounting for any difference between the output power backoff value for the smart antenna traffic channels (with respect to the digital control channel) and the output power backoff value for the sector antenna traffic channels (again with respect to the digital control channel). In accordance with yet another aspect of the present invention, the downlink signal strength measurement on the own serving cell's traffic channel is adjusted by a third factor accounting for power control attenuation provided by the serving base station on the serving traffic channel.

Turning next to the signal strength measurement on a neighboring cell's measurement channel: in accordance with one aspect of the present invention, the signal strength measurement on a neighboring cell's measurement channel is adjusted by a factor accounting for the output power backoff value for the sector antenna traffic channels (with respect to the digital control channel).

When each of the foregoing factors is taken into account to produce an adjusted downlink signal strength measurement on the own serving cell's traffic channel, as well as an adjusted signal strength measurement on a neighboring cell's control channel, cell boundary location is preserved independent of base station use of sector and/or smart antennas, and the adjusted values may be compared against each other (as off-set by any imposed hysteresis value) to more precisely locate the mobile station and uniformly, predictably and accurately identify when it is appropriate to authorize a hand-off.

BRIEF DESCRIPTION OF THE DRAWINGS

A more complete understanding of the method and apparatus of the present invention may be acquired by reference to the following Detailed Description when taken in conjunction with the accompanying Drawings wherein.

DETAILED DESCRIPTION OF THE DRAWINGS

Figure 4A:
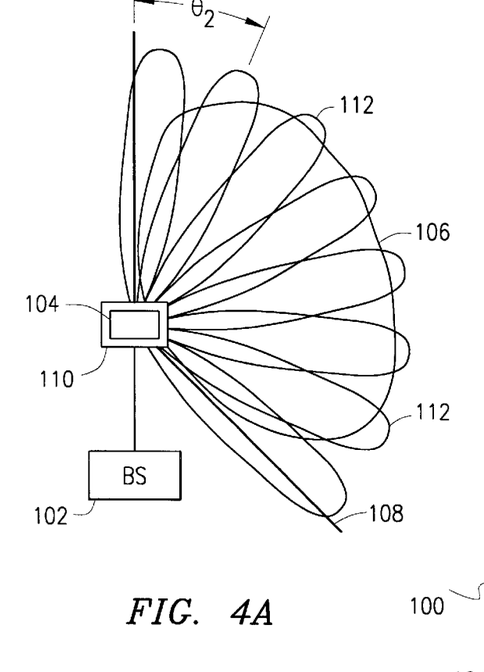
FIGS. 4A and 4B are diagrams of directive antenna beam coverage within a combined sectorized/smart antenna cell of the present invention.

Reference is now made to FIG. 4A wherein there is shown a diagram of directive antenna beam coverage within a combined sectorized/smart antenna cell 100 of the present invention. A base station 102 for the cell 100 includes a first directive (sector) antenna 104 operable to form a wide beam 106 for each sector 108, with the totality of the sector coverage formed thereby providing substantially omni-directional radio frequency coverage throughout the cell site area. The base station 102 for the cell 100 further includes a plurality of second directive (smart) antennas 110, one for each sector, and each operable to form a plurality of separate, perhaps slightly overlapping, narrow beams 112 (either switched or steerable) within each sector 108, with the totality of the smart beams formed thereby providing substantially omni-directional radio frequency coverage throughout the cell site area. For ease of illustration only one sector 108 is shown. It is further understood that only one physical directive antenna (comprising, for example, an antenna array) may be needed to implement the logical first and second directive antennas 104 and 110. In operation, each of the wide beams 106 formed by the first directive antenna 104 is in continuous use to provide service within each corresponding sector 108 to mobile stations 114 present therein. With respect to the second directive antenna 110, however, only those narrow beams 112 which are needed to serve active mobile stations 114 therein are in use at a given time, as is illustrated in FIG. 4B.

Figure 4B:
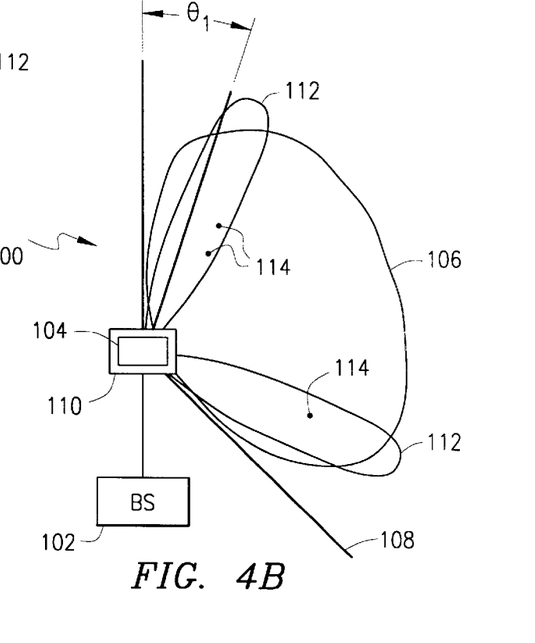
Figure 5:
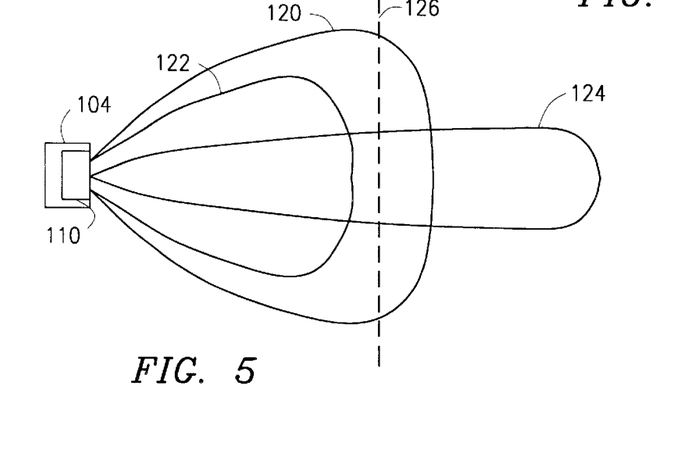
FIG. 5 illustrates different coverage ranges with respect to different antenna/power combinations for the combined sectorized/smart antenna cell of FIGS. 4A and 4B.

Reference is now made to FIG. 5 wherein there are illustrated different coverage ranges with respect to different antenna/power channel combinations for the combined sectorized/smart antenna cell of FIGS. 4A and 4B. First, the digital control channel (DCCH) is supported by the sector antenna 104 with a given power level ($P_{DCCH}$) to provide a DCCH coverage range 120. Second, the digital traffic channel(s) (DTC) may also be supported by the sector antenna 104 with a given power level ($P_{SECTOR}$) to provide a sector DTC coverage range 122. Third, the digital traffic channel(s) (DTC) are supported by the smart antenna 110 with a given power level ($P_{SMART}$) to provide a smart DTC coverage range 124. The border 126 between cells is defined by the sector DTC coverage range 122 (even if the sector antenna 104 were in actuality only used to support the digital control channel). Thus, it is noted that the smart DTC coverage range 124 extends out past both the DCCH coverage range 120 and the sector DTC coverage range 122, which gives rise to the extended coverage range cell border disturbance issues discussed above (see, FIG. 3).

In making evaluations on downlink signal strength measurements, such as those required to be made in the context of hand-off evaluation and determination, the differences in power levels used in the different antenna/power channel combinations must be taken into account. To this end, each cell is characterized by its power backoffs. The backoff identifies whether the power level of the control channel differs from the power level of the traffic channel in each cell. Knowledge of such information is required to properly compare mobile station made (mobile assisted hand-off—MAHO) control channel signal strength measurements to MAHO traffic channel signal strength measurements. For the combined sectorized/smart antenna cell of FIGS. 4A and 4B, the output power backoff values of interest are, first, the power backoff for the sector digital traffic channels ($BO_{SECTOR}$) measured at the antenna terminal which is given by:

$$BO_{SECTOR} = P_{DCCH} - P_{SECTOR},$$

and, second, the power backoff for the smart digital traffic channels ($BO_{SERVING}$) measured at the antenna terminal which is given by:

$$BO_{SERVING} = P_{DCCH} - P_{SMART}.$$

It will, of course, be understood that in certain scenarios the $P_{DCCH}$ will equal $P_{SECTOR}$ in which case the $BO_{SECTOR}$ is zero.

Figure 6:
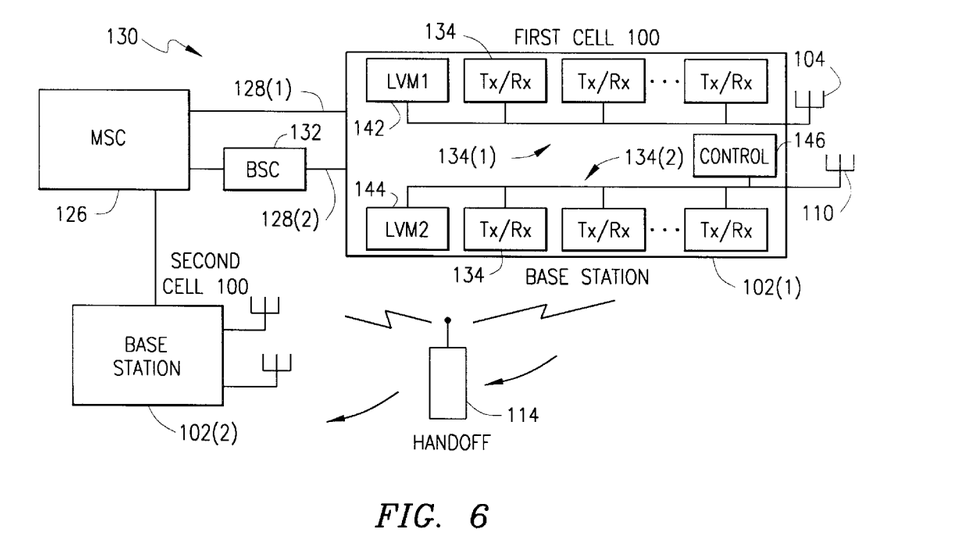
FIG. 6 is a block diagram of a cellular system including base stations implementing the combined sectorized/smart antenna cell illustrated in FIGS. 4A and 4B.

Reference is now made to FIG. 6 wherein there is shown a block diagram of a cellular system 130 including base stations 102 implementing the combined sectorized/smart antenna cell illustrated in FIGS. 4A and 4B. Each base station 102 includes a plurality of transceivers (Tx/Rx) 134 which operate in either as digital or analog mode on a certain frequency assigned to the cell 100 where the base station is located. A first set 134(1) of one or more of these transceivers 134 (providing at least control and perhaps also traffic channels) are connected to the first directive (sector) antenna 104 supporting the sector beams 106 (see, FIGS. 4A and 4B). A second set 134(2) of a plurality of these transceivers 134 (most likely providing only traffic channels) are connected to the second directive (smart) antenna 110 supporting the smart antenna beams 112 (see, FIGS. 4A and 4B). Each base station 102 is connected to a mobile switching center (MSC) 126. This connection may be made either directly (as generally indicated at 128(1)) or through a base station controller (BSC) 132 (as generally indicated at 128(2)). The manner of operation of the mobile switching center 126, base station controller 132 and base stations 102 in a coordinated fashion to provide cellular telephone service to mobile stations is well known to those skilled in the art.

The base station 102 further includes a first location verification module (LVM1) 142 operable in connection with the first directive (sector) antenna 104 to make measurements on mobile station uplink analog/digital communications. The location verification module 142 is provided with an order to make these measurements. This order specifies a frequency on which the measurements are to be made, a time slot within which the measurements are to be made, and a digital voice color code (DVCC) necessary to unambiguously identify the mobile station whose uplink communications are to be measured. Responsive to the received order, the location verification module 142 tunes to the proper frequency within the proper time slot, decodes the DVCC, and then makes the uplink measurements on certain metrics such as signal strength and signal quality. The measurements are then reported for subsequent evaluation in connection with system operation, such as, for example, handoff determinations.

The base station 102 still further includes a second location verification module (LVM2) 144 operable in connection with the second directive (smart) antenna 110 to make measurements on mobile station uplink analog/digital communications. The location verification module 144 is similarly provided with an order to make these measurements. This order specifies a frequency on which the measurements are to be made, a time slot within which the measurements are to be made, and a digital voice color code (DVCC) necessary to unambiguously identify the mobile station whose uplink communications are to be measured. Responsive to the received order, the location verification module 144 tunes to the proper frequency within the proper time slot, decodes the DVCC, and then makes the uplink measurements on certain metrics such as signal strength and signal quality. The measurements are then reported for subsequent evaluation in connection with system operation, such as, for example, handoff determinations. The measurements may also be processed by the second location verification module 144 to determine a direction of arrival (DOA) azimuth orientation angle e (see, FIG. 4A) with respect to the mobile station.

Although illustrated as having a location verification module for each of the first directive (sector) antenna 104 and the second directive (smart) antenna 110, it will of course be understood that only one location verification module is typically needed for most applications and it is preferably used in conjunction with, and connected to, the second directive (smart) antenna. It is also possible to utilize a single location verification module in connection with both the first directive (sector) antenna 104 and the second directive (smart) antenna 110.

The base station 102 still further includes a smart antenna controller 146. The smart antenna controller 146 operates responsive to a determined direction of arrival (DOA) azimuth orientation angle $\theta$ (see, FIG. 4A) identification with respect to a certain mobile station, and then identifies a certain one of the plurality of separate, perhaps slightly overlapping, narrow beams 112 corresponding to that angle for serving the mobile station. The smart antenna controller 146 then configures the second directive antenna 110 for operation to activate the identified beam 112 for handling communications with the mobile station (see, FIG. 4B).

Reference is now once again made to FIGS. 4A and 4B wherein there is further illustrated the differences in measured antenna gain between the beams 106 and 112 as a function of azimuth orientation. It may be seen in FIG. 4B that at a certain azimuth orientation angle ($\theta_1$) the gain of the first directive (sector) antenna 104 is equal to the gain of the second directive (smart) antenna 110. Conversely, at another angle ($\theta_2$) shown in FIG. 4A the gain of the first directive antenna 104 differs quite significantly from the gain of the second directive antenna 110. In making evaluations on downlink signal strength measurements, such as those required to be made in the context of hand-off evaluation and determination, it would be useful if the difference in gain between the first directive antenna 104 (sector coverage 106) and the second directive antenna 110 (smart antenna beam 112) could be determined and characterized as a function of the azimuth orientation angle $\theta$. A number of techniques are available for determining this gain difference ($\Delta GAIN(\theta)$), including those techniques described in commonly assigned, concurrently filed, U.S. application patent Ser. No. 09/259,073, entitled "Method for Antenna Gain Acquisition in a Cellular System", the disclosure of which is hereby wholly incorporated by reference.

Reference is now once again made to FIG. 6. As the mobile stations 114 move within the service area of the network 130, instances arise where a mobile station passes between two cells 100. In moving between the cells 100, the mobile stations 114, in conjunction with base station 102 collected information and also orders exchanged with and between the mobile switching centers 126, have an opportunity through hand-off to change the base station through which cellular radio communications are being effectuated. With knowledge of the power backoff for the serving digital traffic channels (sector or smart), the power attenuation of the serving channel, and the gain difference ($\Delta GAIN(\theta)$) between the sector antenna 104 and the serving (perhaps smart) antenna as a function of azimuth orientation angle, these factors can be taken into account during the mobile station locating and hand-off processes to produce more accurate results and preserve cell boundary location independent of base station use of either a sector or smart antenna for the traffic channel.

Figure 7:
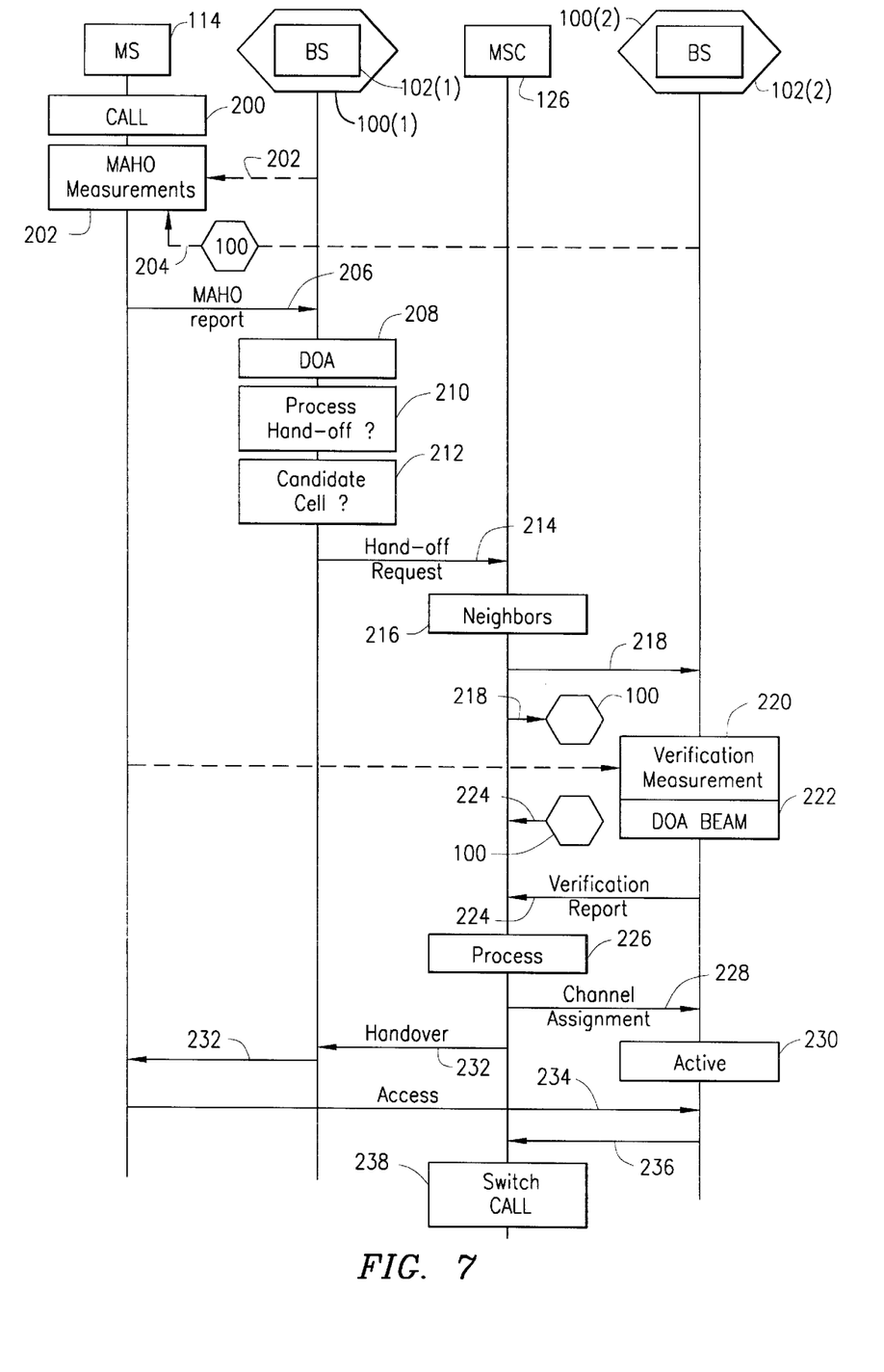
FIG. 7 is a signal flow and network operation diagram illustrating operation of the system of FIG. 6 to complete a mobile station hand-off.

Reference is now additionally made to FIG. 7 wherein there is shown a signal flow and network operation diagram illustrating network operation to make a hand-off of a mobile station. The mobile station 114 is currently engaged in a call 200. The mobile station 114, operating in accordance with known mobile assisted hand-off (MAHO) principles, periodically makes downlink signal strength measurements 202 on the traffic channel (of cell 100(1)) that is currently being used ($SS_{MS,SBS,TC}$), and also periodically makes downlink signal strength measurements 204 on the control (i.e., measurement) channels of network identified cells 100, including cell 100(2), which neighbor the cell 100(1) ($SS_{MS,NBS,CC}$). These signal strength measurements are then reported 206 to the base station 102(1) for the currently serving cell 100(1).

The base station 102(1) for the serving cell makes a direction of arrival (i.e., the azimuth orientation angle θ) measurements with respect to the mobile station (action 208). The base station 102(1) processes the mobile station 114 reported 206 downlink signal strength measurements (202 and 204) to determine first whether a hand-off is necessary (action 210) and second, if yes, to which candidate cells the hand-off could and/or should preferably occur (action Ad 212). A hand-off is necessary in step 210 when the mobile station could be better served by another cell. The candidate cells identified for potential hand-off in step 212 comprise those cell with respect to whose mobile station measured signal strength on the measurement control channel ($SS_{MS,NBS,CC}$) exceed the mobile station measured downlink signal strength on the traffic channel currently being used ($SS_{MS,SBS,TC}$) by at least the assigned hand-off hysteresis value (HYST) in accordance with the following equation:

$$SS_{MS,NBS,CC} \geq SS_{MS,SBS,TC} + HYST.$$

As discussed above, however, the mobile station made signal strength measurements $SS_{MS,NBS,CC}$ and $SS_{NS,SBS,TC}$ must be adjusted by certain values in order to compensate for the differences (operational and physical) between the sector and smart antennas 104 and 110. More specifically, mobile station measured downlink signal strength on the traffic channel currently being used ($SS_{MS,SBS,TC}$) must be adjusted by power control attenuation on the serving traffic channel ($ATTN_{TC}$), the difference in antenna gain (ΔGAIN (θ)) between the conventional sector antenna 104 and the serving antenna (which could be a smart antenna 110) used for the broadcast at the determined azimuth orientation angle, and the difference in backoff power (ΔBO= $BO_{SERVING} - BO_{SECTOR}$) in the serving cell. Furthermore, mobile station measured signal strength on the measurement control channel ($SS_{MS,NBS,CC}$) must be adjusted by the $BO_{SECTOR,N}$ in the neighboring (target) cell. After making the appropriate adjustments, in accordance with the foregoing considerations, the candidate cells identified for potential hand-off in step 212 will comprise those cells for which the following equation is satisfied:

$$SS_{MS,NBS,CC} + BO_{SECTOR,N} \geq SS_{MS,SBS,TC} + ATTN_{TC} + \Delta GAIN(\theta) + \Delta BO + HYST,$$

wherein:

ΔGAIN(θ)=$G_{SECTOR} - G_{SERVING}(\theta)$ in the serving cell; and

ΔBO=$BO_{SERVING} - BO_{SECTOR}$ in the serving cell.

In this example, it is assumed that the base station 102(1) determines 210 that a hand-off is necessary. It is further assumed that an identification 212 is made of a plurality of candidate cells 100 for hand-off. It will, of course, be understood that the decision to hand-off may instead be made by the mobile station itself. A request 214 for hand-off including information comprising an identification of the currently serving cell 100(1), the traffic channel being used for communication with mobile station 114 in cell 100(1), the time slot (for a digital traffic channel) carrying the cellular communication, the digital voice color code (DVCC), and the list of potential candidate cells 100 for hand-off, is then sent by the base station 102(1) to the serving mobile switching center 126.

Responsive to the request 214, the serving mobile switching center 126 may identify (if not already determined from the MAHO neighbor list) in action 216 which of its connected cells 100 are neighbors (i.e., candidate cells) to cell 100(1) for hand-off. The mobile switching center 126 then signals 218 the base station 102 for each of its connected candidate cells 100, such as the cell 100(2), to make a verifying signal strength measurement (action 220) on the traffic channel currently being used by the mobile station 114 in the currently serving cell 100(1). In connection with the making of this step 220 measurement, the base station 102(2) further makes in step 222 a direction of arrival azimuth orientation angle determination towards the mobile station 114 and further identifies which one of the plurality of separate, perhaps slightly overlapping, narrow beams 112 correspond with that angle and thus would be needed to serve the mobile station 114 within the cell 100(2).

Each base station 102 instructed by a received signal 218 then reports 224 the results of the verification signal strength measurement to the mobile switching center 126 (in, for example, a hand-off measurement report), along with an identification (if available) of both the direction of arrive azimuth orientation angle and the narrow beam 112 corresponding to that angle. The verification signal strength measurement results are then processed (action 226) by the mobile switching center 126 to determine which one of the candidate cells 100 comprises the best (i.e., the target) cell for hand-off of the call 200 based on the success and strength of the verification signal strength measurement. It is recognized that the validation process performed by the mobile switching center 126 may further require that the signal strength measurements be compensated according to base station power control, backoff power, and antenna gain parameters.

The mobile switching center 126 then assigns (and reserves) a traffic channel (and time slot therein for a digital traffic channel) for hand-off of the call 200. The base station 102(2) is then informed 228 of the assignment by the mobile switching center 126 of the traffic channel in the target cell 100(2), the signal 228 to the base station 102(2) including an identification of both the direction of arrive azimuth orientation angle and the narrow beam 112 corresponding to that angle (that were provided in the step 224 report). Responsive thereto, the base station 102(2) activates the proper narrow beam 112 in step 230 that is either identified and/or corresponds to the provided direction of arrival information. The mobile switching center 126(1) then signals 232 the mobile station 114 via the base station 102(1) for the currently serving cell 100(1) with a handover command directing the mobile station to switch to the assigned traffic channel (and time slot therein if appropriate) in the target cell 100 (2). The mobile station 114 then tunes to and accesses 234 the assigned traffic channel (in the proper time slot). When the base station 102(2) detects the mobile station access, the mobile switching center 126 is informed 236, and the call 200 is switched 238 to the base station 102(2) for further handling to complete the hand-off procedure.

Although preferred embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. A method for mobile station locating in connection with a potential hand-off, comprising the steps of:
    measuring by the mobile station of downlink received signal strength on a currently used traffic channel broadcast from a first base station of a currently serving cell;
    measuring by the mobile station of downlink received signal strength on a measurement channel broadcast from a second base station of a neighboring cell to the currently serving cell;
    wherein the first base station supports either a smart antenna or sector antenna for broadcasting the traffic channel and the second base station supports a sector antenna for broadcasting the measurement channel;
    adjusting the mobile station measured downlink received signal strengths on the serving cell's traffic channel and the neighboring cell's measurement channel in order to take into account any operational and physical differences which exist between the sector antenna used to broadcast the measurement channel and the antenna used to broadcast the traffic channel; and
    comparing the adjusted downlink received signal strength measurements to each other to determine whether the mobile station is better served by the neighboring cell.

2. The method as in claim 1 wherein the steps of measuring are performed in the context of mobile assisted hand-off (MAHO) measurement activities performed by the mobile station.

3. The method as in claim 1 wherein the step of adjusting comprises the step of adjusting the mobile station measured downlink received signal strengths on the serving cell's traffic channel by factor which accounts for any noted difference in gain between a sector antenna and the traffic channel antenna of the currently serving cell as a function of an azimuth angle of orientation from the base station of the currently serving cell to the mobile station.

4. The method as in claim 3 wherein the step of adjusting comprises the step of adjusting the mobile station measured downlink received signal strengths on the serving cell's traffic channel by factor which accounts for any difference between a output power backoff value for the traffic channel broadcast by the traffic channel antenna of the currently serving cell and a output power backoff value for a traffic channel broadcast by a sector antenna of the currently serving cell.

5. The method as in claim 4 wherein:
    the output power backoff value for the traffic channel antenna broadcast is determined by a difference between traffic channel antenna broadcast power and sector antenna control channel broadcast power; and
    the output power backoff value for the sector antenna traffic channel broadcast is determined by a difference between sector antenna traffic channel broadcast power and sector antenna control channel broadcast power.

6. The method as in claim 4 wherein the step of adjusting comprises the step of adjusting the mobile station measured downlink received signal strengths on the serving cell's traffic channel by factor which accounts for power control attenuation provided by the currently serving base station on the serving traffic channel.

7. The method as in claim 4 wherein the step of adjusting comprises the step of adjusting the mobile station measured downlink received signal strengths on the neighboring cell's control channel by factor which accounts for a output power backoff value for a traffic channel broadcast by a sector antenna of the neighboring cell.

8. The method as in claim 7 wherein the output power backoff value for the sector antenna traffic channel broadcast is determined by a difference between sector antenna traffic channel broadcast power and sector antenna control channel broadcast power.

9. The method as in claim 1 wherein the step of comparing comprises the step of determining that the mobile station is better served if the adjusted downlink received signal strength on the neighboring cell's measurement channel exceeds the adjusted downlink received signal strength on the serving cell's traffic channel.

10. The method as in claim 1 wherein the step of comparing comprises the step of determining that the mobile station is better served if the adjusted downlink received signal strength on the neighboring cell's measurement channel exceeds the adjusted downlink received signal strength on the serving cell's traffic channel by a predetermined hysteresis value.

11. A cellular communications network, comprising:
    a serving cell supporting a cellular call with a mobile station through a serving base station broadcasting a traffic channel for the cellular call using either a smart antenna or sector antenna;
    a neighboring cell to the serving cell and having a neighboring base station broadcasting a measurement channel using a sector antenna;
    wherein the mobile station operates to make and report on downlink received signal strength with respect to:
        the currently used traffic channel broadcast from the serving base station; and
        the measurement channel broadcast from the neighboring base station; and
    a control node operable responsive to the reported verification signal strength measurements to:
        adjust the mobile station measured downlink received signal strengths in order to take into account any operational and physical differences which exist between the sector antenna used to broadcast the measurement channel and the antenna used to broadcast the traffic channel; and
        compare the adjusted downlink received signal strength measurements to each other to determine whether the mobile station is better served by the neighboring cell.

12. The network as in claim 11 wherein the mobile station makes its downlink received signal strength measurements in the context of mobile assisted hand-off (MAHO) measurement activities.

13. The network as in claim 11 wherein the control node adjusts the mobile station measured downlink received signal strengths on the serving cell's traffic channel by factor which accounts for any noted difference in gain between a sector antenna and the traffic channel antenna of the serving cell as a function of an azimuth angle of orientation from the base station of the serving cell to the mobile station.

14. The network as in claim 13 wherein the control node adjusts the mobile station measured downlink received signal strengths on the serving cell's traffic channel by factor which accounts for any difference between a output power backoff value for the traffic channel broadcast by the traffic channel antenna of the serving cell and a output power backoff value for a traffic channel broadcast by a sector antenna of the serving cell.

15. The network as in claim 14 wherein:
- the output power backoff value for the traffic channel antenna broadcast is determined by a difference between traffic channel antenna broadcast power and sector antenna control channel broadcast power; and
- the output power backoff value for the sector antenna traffic channel broadcast is determined by a difference between sector antenna traffic channel broadcast power and sector antenna control channel broadcast power.

16. The network as in claim 14 wherein the control node adjusts the mobile station measured downlink received signal strengths on the serving cell's traffic channel by factor which accounts for power control attenuation provided by the currently serving base station on the serving traffic channel.

17. The network as in claim 14 wherein the control node adjusts the mobile station measured downlink received signal strengths on the neighboring cell's control channel by factor which accounts for a output power backoff value for a traffic channel broadcast by a sector antenna of the neighboring cell.

18. The network as in claim 17 wherein the output power backoff value for the sector antenna traffic channel broadcast is determined by a difference between sector antenna traffic channel broadcast power and sector antenna control channel broadcast power.

19. The network as in claim 11 wherein the control node comparison determines that the mobile station is better served if the adjusted downlink received signal strength on the neighboring cell's measurement channel exceeds the adjusted downlink received signal strength on the serving cell's traffic channel.

20. The network as in claim 11 wherein the control node comparison determines that the mobile station is better served if the adjusted downlink received signal strength on the neighboring cell's measurement channel exceeds the adjusted downlink received signal strength on the serving cell's traffic channel by a predetermined hysteresis value.

\* \* \* \* \*

UNITED STATES PATENT AND TRADEMARK OFFICE
CERTIFICATE OF CORRECTION

PATENT NO. : 6,259,918 B1
DATED : July 10, 2001
INVENTOR(S) : Labonte et al.

It is certified that error appears in the above-identified patent and that said Letters Patent is hereby corrected as shown below:

<u>Column 1,</u>
Line 2, delete "at"

<u>Column 6,</u>
Line 4, replace "e" with -- θ --

Signed and Sealed this

Thirtieth Day of April, 2002

Attest:

JAMES E. ROGAN
*Director of the United States Patent and Trademark Office*

*Attesting Officer*